(12) United States Patent
Wee

(10) Patent No.: US 6,400,763 B1
(45) Date of Patent: Jun. 4, 2002

(54) COMPRESSION SYSTEM WHICH RE-USES PRIOR MOTION VECTORS

(75) Inventor: Susie J. Wee, Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/252,189

(22) Filed: Feb. 18, 1999

(51) Int. Cl.[7] .............................................. H04N 7/12
(52) U.S. Cl. ........................ 375/240.16; 375/240.01; 386/68
(58) Field of Search .................. 375/240.12, 240.16, 375/240.01, 240.04, 240.05, 240.06, 240.07, 240.13, 240.24; 348/416.1, 413.1; 386/68; 382/236, 238; H04N 7/12

(56) References Cited

U.S. PATENT DOCUMENTS

| | | | |
|---|---|---|---|
| 5,512,953 A | | 4/1996 | Nahumi |
| 5,600,646 A | | 2/1997 | Polomski |
| 5,621,464 A | | 4/1997 | Teo et al. |
| 5,623,312 A | | 4/1997 | Yan et al. |
| 5,739,862 A | | 4/1998 | Cen |
| 5,751,364 A | * | 5/1998 | Yasuda et al. .......... 375/240.16 |
| 6,201,927 B1 | * | 3/2001 | Comer ..................... 386/68 |
| 6,233,392 B1 | * | 5/2001 | Comer ..................... 386/68 |

OTHER PUBLICATIONS

Shih–Fu Chang and David G. Messerschmitt, "Manipulation and Compositing of MC–DCT Compressed Video", IEEE Journal on Selected Areas in Communications, vol. 13, No. 1, Jan. 1995.

Huifang Sun, Wilson Kwok and Joel W. Zdepski, "Architectures for MPEG Compressed Bitstream Scaling", IEEE Transactions on Circuits and Systems for video Technology, vol. 6, No. 2, Apr. 1996.

Susie J. Wee, Reversing Motion Vector Fields:, IEEE International Conference on Image Processing, Chicago, IL, Oct. 1998.

Susie J. Wee, Bhaskaran Vasudev and Sam Liu, "Transcoding MPEG Video Streams in the Compressed Domain", HP Image and Data Compression Conference, Palo Alto, CA, Mar. 1997.

Ming–Syan Chen and Dilip D. Kandlur, "Downloading and Stream Conversion: Supporting Interactive Playout of Videos in a Client Station", International Conference on Multimedia Computing, May 1995.

\* cited by examiner

*Primary Examiner*—Nhon Diep
(74) *Attorney, Agent, or Firm*—Marc P. Schuyler

(57) ABSTRACT

This disclosure provides a reverse play system that may be used with newer digital television and image standards. In particular, a compressed input including motion vectors is received, and the motion vectors are used to calculate closest match positions. The order of image frames is then reversed, and reverse motion vectors are calculated anew. In calculating new motion vectors, compression software performs motion search for each data block by first comparing a local neighborhood around the block with the closest match positions. If there is an exact match (between the data block and a closest match position), then an original motion vector is inverted and exactly re-used as a motion vector in reverse play. If there are several (non-exact) matches, the software weights every motion vector associated with overlap of the neighborhood and selects the motion vector corresponding to the largest overlap. Alternatively, if a sufficiently large local neighborhood is used, the software can select the motion vector corresponding to the smallest residual energy. If there is no overlap at all with any closest match position, then motion search is performed upon spatial domain data.

20 Claims, 5 Drawing Sheets

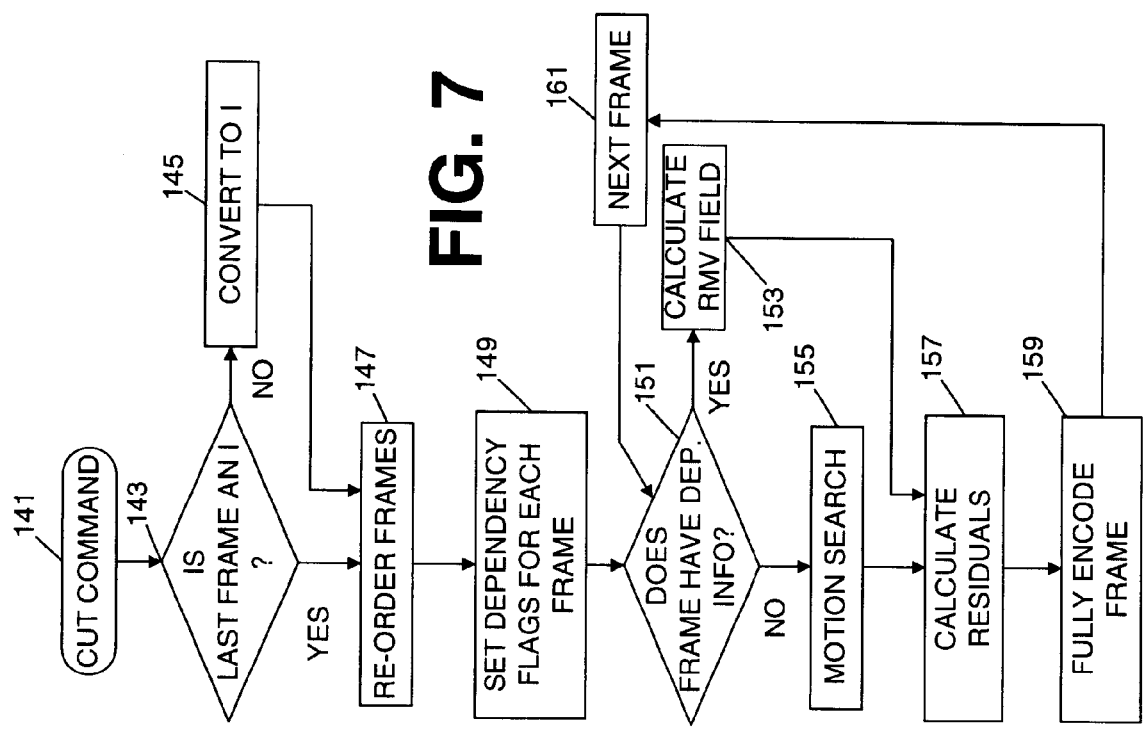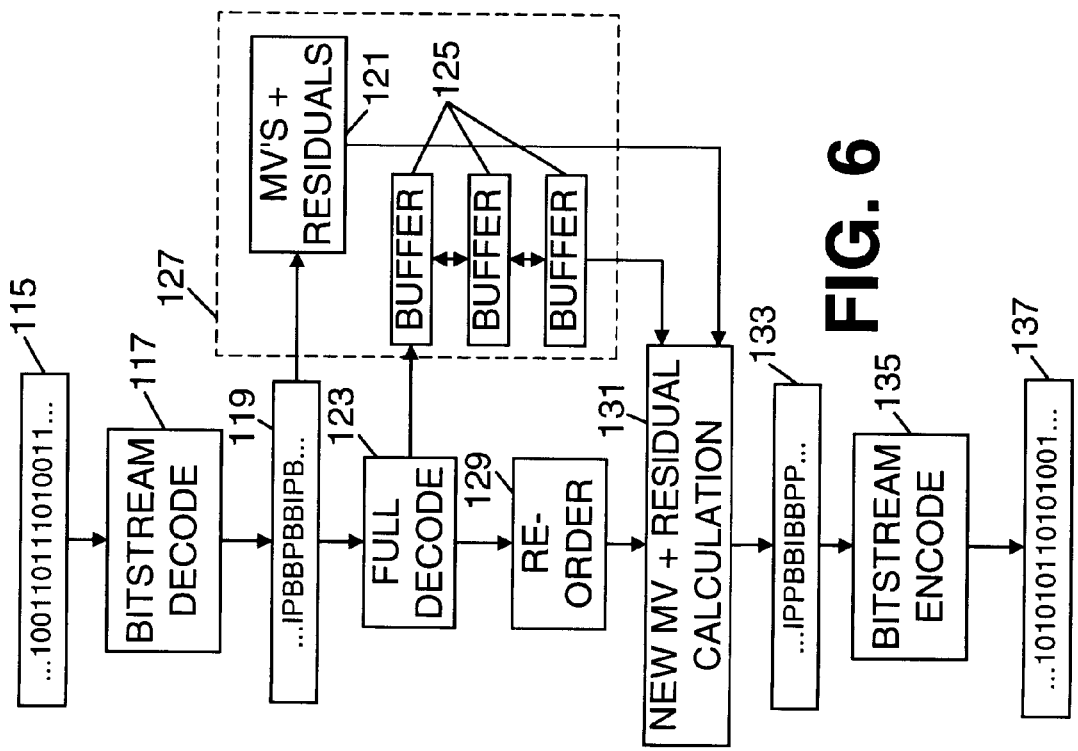

COMPRESSION SYSTEM WHICH RE-USES PRIOR MOTION VECTORS

The present invention relates to compression of image sequences. More particularly, this disclosure provides an improved reverse play system that compresses an output image signal by re-using motion vectors from a compressed image input signal.

BACKGROUND

Digital video formats such as those used for high definition television (HDTV) will be much more widely used in the next decade, due to improvements in compression technology and also to laws which mandate HDTV broadcast. These digital video formats typically include more picture information than conventional video (e.g., "NTSC" the present television standard in the United States, as well as "SECAM," "PAL" and other conventional standards), and bandwidth constraints will likely require storage and transmission in compressed format. This operation conflicts with operation of present day televisions (TVs), video cassette recorders (VCRs) and similar equipment which do not receive and transmit signals in compressed format.

Thus, the new standards probably require compatible video players which also, as with present day equipment, provide search, fast forward, reverse play, and similar functions. However, if the newer digital equipment (e.g., HDTVs) only accept compressed signals, then video players will need to output compressed signals that already incorporate these services, wherein arises a difficulty; performing these functions will likely require a video player to completely de-compress a stored video signal, re-order frames to affect a reverse order, and then compress the re-ordered frames, all in real-time. This processing is computationally very expensive because compression requires a substantial amount of processing resources.

1. Processing Resources Required for Typical Compression

To understand why substantial processing resources are often required, it will be helpful to first discuss compression techniques which rely upon block-based encoding. There are many compression standards which use block-based encoding, but for purposes of explanation, the discussion below focusses on a standard proposed by the Motion Picture Experts Group, called "MPEG-2;" MPEG-2 encodes data in blocks of identically-sized, square "tiles," and is explained with respect to FIGS. 1–2.

FIG. 1 shows two image frames, including an earlier frame 11 and a later frame 13. In accordance with typical MPEG-2 compression protocol, the later frame 13 is completely divided into a number of square tiles 15, although only four such tiles are illustrated in FIG. 1 for purposes of discussion. These tiles each represent a group of pixels, for example, sixteen pixels across by sixteen pixels down, or eight pixels across by eight pixels down. The "pixel" is the smallest unit of image data, and can have a unique color and brightness. To reduce the amount of data that is required to reproduce the later frame, each tile 15 is compressed to simply be information on how that tile can be reproduced from image data elsewhere (i.e., by copying and modifying another part of either the same image frame or another image frame). Otherwise stated, the compression process results in information indicating where other similar data may be found and how that similar data must be modified in order to recreate the tile of interest. In this example, it will be assumed that each tile 15 illustrated in the later frame will be reproduced from the earlier frame. Notably, decoders usually decode one frame at a time from compressed format to the spatial domain, so that when it comes time to decode the later frame, the earlier frame will have already been decoded.

Each frame is tiled in a similar manner, as indicated by corresponding square tiles 17 of the earlier frame. These corresponding tiles 17 might not be the "closest match" with which to recreate the later frame and, for purposes of discussion, it will be assumed that the closest matches are respectively located as identified by reference squares 19.

Therefore, with reference to FIG. 2, each tile of the later frame is recreated using both motion vectors 21 and associated sets of residuals. Four motion vectors 21 are indicated in FIG. 2, each identifying an offset for finding the closest match in the prior frame. The motion vectors 21 correspond to the difference in positions (illustrated via FIG. 1) between each corresponding tile 15 and their closest matches 19. The residuals are simply raw differences in pixel intensity and color (there are usually two sets of residuals per motion vector) which are added to the closest match in order to exactly recreate each of the tiles 15.

Search for the closest match is computationally very expensive, because one must compare each tile 15 with many different identically sized groups of data from the earlier frame 11; each tile is typically compared with every possible subset of data falling within an earlier frame-search window that is four times the tile size or larger. Usually, the result of each comparison is stored, and the closest match is determined by choosing the subset of data that yields the fewest differences. The amount of processing often required for such "motion search" can be observed by noting that (a) because a search window is often four times tile size, either 256 or 64 different comparisons are performed for each tile to determine its closest match, (b) each pixel in each tile usually has at least 8 bits of brightness information and 8 bits of color information, which are often all used in each comparison (e.g., each and every comparison can involve many thousands of bits), and (c) in a typical digital image signal there may be several thousand tiles that are compressed using motion search. Motion search often requires over seventy percent of processing resources used to compress the video.

2. Difficulties in Reversing Play in a Compressed Signal

As indicated, reverse play conventionally is performed by completely decompressing image frames to the spatial domain, re-ordering those frames, and then compressing those frames, which includes performing motion search as has just been described for each tile of the newly ordered frames. In the example indicated by FIGS. 1–2, backward play would be achieved by placing the later frame first, the earlier frame second, and again compressing the two frames (except that this time with motion vectors describing how to produce the earlier frame from the later frame instead of vice-versa).

Conventionally, decoding frames to the spatial domain is needed because block-based compression is typically a one-way function. That is to say, a later frame can be reproduced from an earlier frame upon which it depends, but the reverse is often not true, for reasons explained with reference to FIG. 3.

As represented by FIG. 3, in reverse play, the earlier frame 11 now follows the later frame 13 in order, and the earlier frame must now be reproduced from the later frame. The original encoding of motion vectors and sets of associated residuals, however, does not necessarily reflect all data in the earlier frame 11. This can be seen by noting that a significant amount of image space for the earlier frame (represented by the shaded region 23 of FIG. 3) may have no closest match in the later frame. Since it is desired that this information also be reproduced from a closest match, conventional backward play calls for full motion search as was described above, in the reverse direction. In other words, the earlier frame would be divided into tiles (as indicated by reference blocks 17 in FIG. 1) and these tiles would then typically each be compared to subsets of data in a search window in the later frame 13 to determine the closest matches.

Unfortunately, as mentioned, full motion search can take enormous processing resources; if a signal is to be reversed and output in compressed format in real-time, e.g. reverse play by a VCR or video disk player, then full motion search may have to be performed across tens of millions of bits per second, a significant processing task even for today's very fast computers and film editing machines.

What is needed is a compression system that is less taxing on computational resources. Still further, a need exists for a system that does not require full motion search to provide reverse play capability. Such a system would have ready applicability to VCRs, Internet servers and computers, compact disk and other video players, and the like, especially with those systems which are adapted to handle HDTV. The present invention satisfies these needs and provides further, related advantages.

SUMMARY

The present invention solves the aforementioned needs by providing a compression system that estimates motion vectors in compression. By using earlier motion vectors from the input signal to compute new motion vectors which point in the reverse direction, the present invention eliminates a potentially significant portion of the searching that would be required. The present invention thus significantly assists real-time processing by video players, such as VCRs, video disk players, Internet servers and the like, that can provide reverse play and other functions while being compatible with the new digital video standards.

One form of the present invention provides a system that receives a compressed input including a later frame which depends on an earlier frame. These frames are to be reversed in dependency by de-compressing both frames and then re-compressing the earlier frame to now depend upon the later frame (the order in which the frames are actually output may also be changed). As would be conventional, the frames are first converted to the spatial domain for re-ordering or other processing.

According to the present invention, however, at least one motion vector is extracted from the compressed image input. This motion vector describes a position where a closest match may be found in an earlier frame, with which to reconstruct part of a later frame. According to the method, this motion vector is used to derive reverse-direction data; in the preferred embodiment, for example, the reverse direction data can be a location of closest match data in the earlier frame.

During re-compression, the earlier frame is divided into data blocks, for example, 8×8 or 16×16 pixel tiles as described above, or variable size data blocks such as in a MPEG-4 format. The location of the closest match is compared with a local neighborhood defined by a data block position to determine overlap. If there is overlap, the extracted motion vector is inverted and used to calculate a new motion vector.

Articulated somewhat differently, the present invention extracts a motion vector from the compressed input and determines whether that motion vector may be inverted and "re-used." This determination is based on whether the tile being compressed is similar to a closest match reflected by the input signal, i.e., if the two are very similar, then extensive motion search does not have to be performed, because the inverted motion vector already provides information that may be used to find a "closest match."

In more particular features of the invention, all motion vectors from the compressed input are inverted and combined with the location of their data blocks or tiles to yield closest match positions. These positions can be stored in memory and when it comes time to compress data in the reverse direction, as each data block or tile is processed, compression software polls the table to determine overlap between any closest match location and the neighborhood for the data block or tile presently being compressed. If overlap exists, then the amount of motion search is reduced substantially. Preferably, if there is overlap between multiple closest matches and the data block or tile in question, then the closest match having the largest overlap is determined, and only its motion vector is used to derive a new motion vector. The preferred embodiment can then proceed directly to calculate residuals, without any motion search. Alternatively, the system can resolve multiple overlaps by looking at residual energy, and selecting a motion vector corresponding to lowest residual energy.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 1 shows a first frame 11 which is an "earlier" frame in an image sequence, and a second, later frame 13 having at least four "tiles" 15 that are each compressed to motion vector and residual format in dependence upon "closest matches" 19 in the first frame.

FIG. 6 is a functional block diagram illustrating extraction of motion vectors, re-ordering of frames, and compression of re-ordered frames in the preferred embodiment.

FIG. 7 is a functional block diagram illustrating re-ordering of frames in the preferred embodiment; as seen in FIG. 7, in response to reverse play, indicating a "cut" at a particular frame, the preferred embodiment converts the first frame to be displayed to an I frame and compresses each subsequent frame using a reverse motion vector field associated with that frame.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of a system that provides reverse play of compressed video images. The invention, however, may also be applied to other types of systems as well.

Importantly, as used herein, the term "video" refers to any image sequence that is played to create moving images; the term includes both interlaced formats, such as NTSC and HDTV, as well as non-interlaced formats such as HDTV. Also, the term "tile" as used herein refers to a constant, division area of image frames that does not change from frame to frame; for example, in a MPEG-2 format, the first "tile" may be taken as the 16-by-16 pixel square at the upper left hand corner of any image frame, and the second "tile" would be the 16-by-16 pixel square immediately next to and laterally adjacent the first tile.

Figure 4:
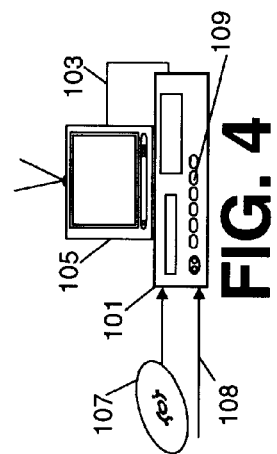
FIG. 4 is an illustrative diagram showing one preferred implementation of the present invention, namely, a video player or video cassette recorder (VCR) that outputs a compressed signal to a high definition television (HDTV); in this embodiment, the invention is embodied as firmware that provides the video disk player with reverse play capability, such that a compressed input such as from a video disk (e.g., a compact disk) or tape can have its frames re-ordered in real-time and still be provided as a compressed output to the HDTV.
Figure 1:
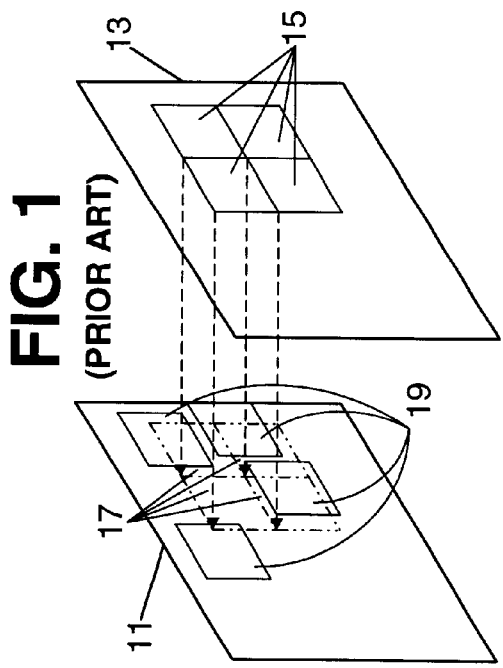
FIG. 1 is an illustrative diagram used to explain conventional block-based compression. In particular.
Figure 2:
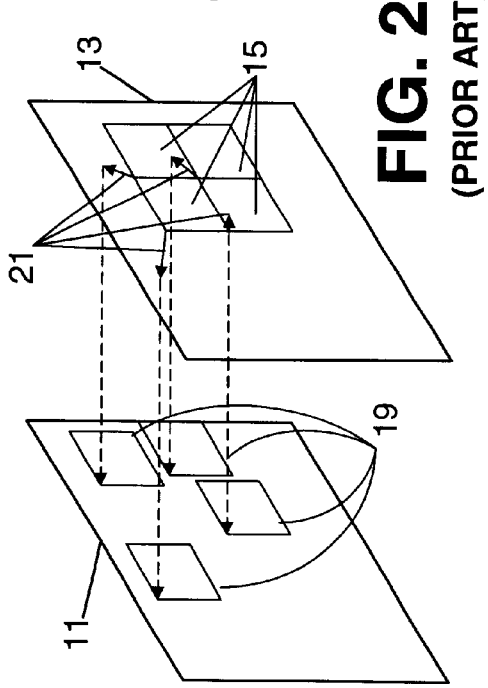
FIG. 2 is an illustrative diagram showing the frames of FIG. 1, and which also illustrates the presence of motion vectors 21.

In accordance with the present invention, the preferred embodiment is a reverse play video system that receives a compressed image input, and that also provides a compressed image output with re-ordered frames. The reverse play system may be part of a video disk player or video cassette recorder (VCR) 101 which outputs a compressed signal 103 to a high definition television (HDTV) 105, as seen in FIG. 4. In this figure, the video disk player or VCR 101 is seen to receive compressed images from a source, such as a compact disk (CD) 107. The VCR 101 also receives a compressed cable input 108 which it can filter and send to the TV as with conventional VCRs. The reverse play system, actually built within the video player or VCR 101, includes a microprocessor and supporting firmware (which are not separately seen in FIG. 1) and a reverse play button 109. In accordance with the invention, when a user selects the reverse play button, compressed images from the CD 107 are decompressed, re-ordered, re-compressed in re-ordered format, and sent as the compressed output signal 103 to the HDTV, all in real-time.

Figure 5:
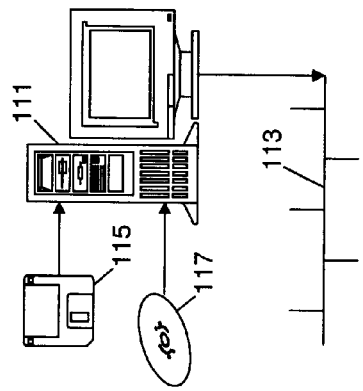
FIG. 5 is an illustrative diagram showing a second implementation of the present invention, namely, a computer such as a personal computer (PC) or an Internet server that outputs a compressed signal for display or for distribution via a cable or other system; in this embodiment, the invention is embodied as software (stored on machine readable media such as a floppy disk) which provides the computer with reverse play ability in response to a user command.

A second preferred embodiment is illustrated in FIG. 5, which shows a computer 111 such as a personal computer (PC) or a video server, a distribution system or source such as the Internet 113, machine readable media 115 which contains reverse play software, and possibly a disk source of compressed video 117. In this second preferred embodiment, a remote user viewing video on his or her computer sends a reverse play signal to the computer; the computer re-orders frames specially for the user and transmits compressed, re-ordered video for display, all in real-time.

Figure 3:
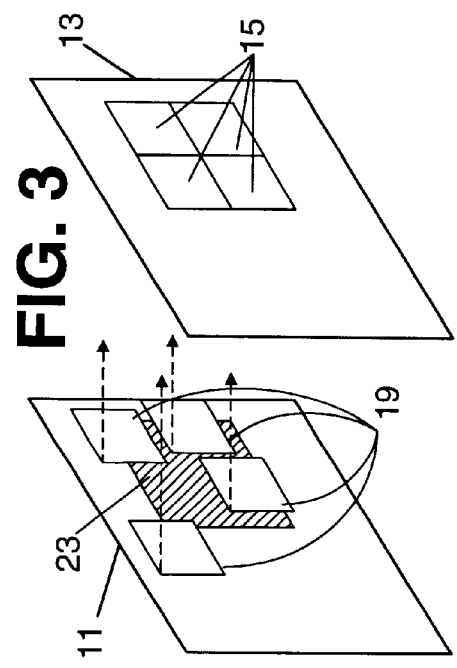
FIG. 3 is another illustrative diagram showing the frames of FIG. 1, used to explain why the motion vectors of FIG. 2 cannot simply be reversed to enable reconstruction of the first frame based upon the second. In particular, since block-based compression is a one way function, for some data (e.g., a shaded region 23) there may be no comparison information available for the later frame.

In accordance with the principles of the present invention, these embodiments reverse play by taking certain shortcuts designed to avoid full motion search in the reverse direction. That is to say, input frames are decoded and re-ordered such that they are ready for compression and final output. However, the preferred embodiment re-uses motion vectors from an input signal to calculate new motion vectors that may be re-used for the compressed output signal. Since these frames are normally exactly reversed in order in a reverse play system, the new motion vectors will point in the exact opposite temporal direction than was previously the case. Also, since block-based encoding is a one way mapping, the new motion vectors will be slightly different than the original motion vectors, since it is desired to have all data in a compressed frame reproduced from another image frame. [In connection with FIG. 3 discussed above, for example, it will be recalled that a shaded region 23 was left unaddressed by simply inverting all motion vectors from the compressed input representation; the preferred embodiment tiles an earlier frame in conventional manner, but uses motion vectors for the closest matches such as for blocks 19 to derive motion vectors for these tiles.]

Processing used in the preferred embodiment is illustrated via FIG. 6, which is a functional block diagram of reverse play. In particular, an input bitstream 115 from a CD, satellite signal or other compressed image source is received and passed to a bitstream decoder 117. The bitstream decoder applies run-length decoding techniques and inverse Huffman coding to yield frames in independent (I), prediction (P) or bi-directional (B) modes in accordance with the well-known MPEG-2 format (hypothetical frames are illustrated within a reference block 119). Decoded P and B frames are expressed as motion vectors and residuals, meaning that each tile of pixel data is expressed as at least one motion vector pointing to another frame, together with residuals which describe how to recreate the tile from a "closest match" in at least one other frame. These motion vectors and residuals are preferably reserved in memory 121 for each frame. The preferred embodiment also fully decodes (as represented by a reference block 123) these frames into spatial domain images, which are then stored in frame buffers 125.

Significantly, each scene is represented as a group of pictures (GOP) which include at least one I frame and a number of P or B frames. Preferably, enough memory 121 and frame buffers 125 are defined in random access memory 127 (RAM) to store an entire GOP at once.

Importantly also, the compressed input can also represent variable size objects such as in the MPEG-4 format, and the individual tiles do not have to be square and identically sized as is the case with the MPEG-2 format. The MPEG-2 format is the presently preferred operand, however, and will form the principal basis for discussion below.

At this point, the frames are re-ordered as indicated by reference block 129, by first indicating where reverse play begins within the sequence and by re-ordering all earlier frames in exactly reverse order behind a current frame. This re-ordering is accomplished by changing frame order as defined in a register of the microprocessor and in the frame buffers themselves as necessary. In addition, as reflected by reference block 131, the re-ordered frames are compressed such that motion vectors, residuals, and other compression data are compatible with the MPEG-2 format (or other pertinent compression standard) in the new order.

For example, if an input image sequence consists of eight frames, numbered 0,1,2,3,4,5,6,7, and compressed according to the following nomenclature

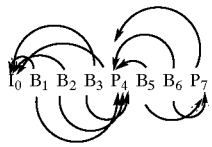

then dependency is hypothetically illustrated using arrows above these frames to indicate forward dependency and below these frames to indicate backward dependency (i.e., upon later frames). In this example it is to be assumed that a user-supplied reverse play command calls for change from forward play to reverse play beginning after display of frame 5. Thus, instead of outputting frames 6 and 7 in continuing order, the microprocessor would output frames 5, 4, 3, 2, 1 and 0 in that order, as indicated by the following nomenclature.

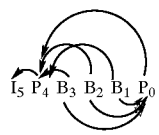

Importantly, during decompression and storage in the frame buffer, frame number 5 would have been fully re-constituted in the spatial domain, and thus, being the first frame selected for reverse play, may be encoded as an I frame. This encoding process (designated by reference block 131), and the process of changing motion vector fields describing dependencies between frames will be further discussed below in connection with FIG. 7.

Finally, once all re-ordered frames are compressed in accordance with the appropriate compression standard, resultant compression data 133 is "fully encoded" by providing appropriate quantization, Huffman coding and run-length coding in well known manner. As indicated in FIG. 6, this process (designated by reference numeral 135) results in an output bitstream 137. This output bitstream may be passed over the Internet or via satellite, displayed via a computer monitor using a HDTV graphics card, or carried via cable to a HDTV.

FIG. 7 illustrates the process of cutting and re-ordering a GOP in the preferred embodiment. As represented by initiation block 141, a reverse play command results in a "cut" indicator which marks a starting frame for which reverse play is to begin (or, if the VCR or other device is already in reverse play mode, from which forward play is to begin anew). In the eight-frame example used above, the "cut" would be placed after the fifth frame in the GOP, indicating that all prior frames are to be re-ordered beginning at that point. Importantly, if the GOP under consideration follows an earlier cut (i.e., the entire GOP is to be re-ordered), then the processing considerations discussed herein are the same, and the last frame in the GOP is treated as the first frame in the re-ordered sequence.

As indicated by a decision block 143, preferred software or firmware running on the video player or computer interrogates the first frame preceding the cut to determine whether that frame is an I frame; it will be recalled that an I frame depends on no other frame for reconstruction, i.e., compression data for that frame includes all information necessary to reconstruct that frame. Preferably, an I frame leads the re-ordered sequence and if the first frame is not an I frame, then as processing block 145 indicates, the first frame is encoded as an I frame. [With reference to FIG. 6, if the first frame is an I frame, its associated compression data from the input signal as stored in memory 121 is retrieved and exactly re-used as output compression data for the first new frame in the sequence; otherwise, spatial domain data from a buffer 125 is simply encoded as an I frame using conventional techniques.]

As indicated by reference block 147 in FIG. 7, the preferred software or firmware then proceeds to re-order frames, principally as indicated in a pointer table (not shown in FIG. 7) stored in RAM or a microprocessor internal register. The software (as indicated by block 149) determines (in reference to the special memory 121 of FIG. 6) whether a frame is "pointed to" by at least one other frame and, if so, sets a flag associated with that frame indicating that information exists to encode the frame as a P or B frame. Also, a flag is set indicating whether the particular frame is a B frame. [Since B frames have both forward and backward dependency, a cut not removing a referenced frame facilitates re-use of B frames' motion vectors, trading the backward motion vectors and forward motion vectors.] Once the flags of all frames left to be displayed (within the current GOP) have been set, as appropriate, the preferred software or firmware then proceeds to encode the frames to be displayed as a compressed output representing re-ordered frames.

Figure 8:
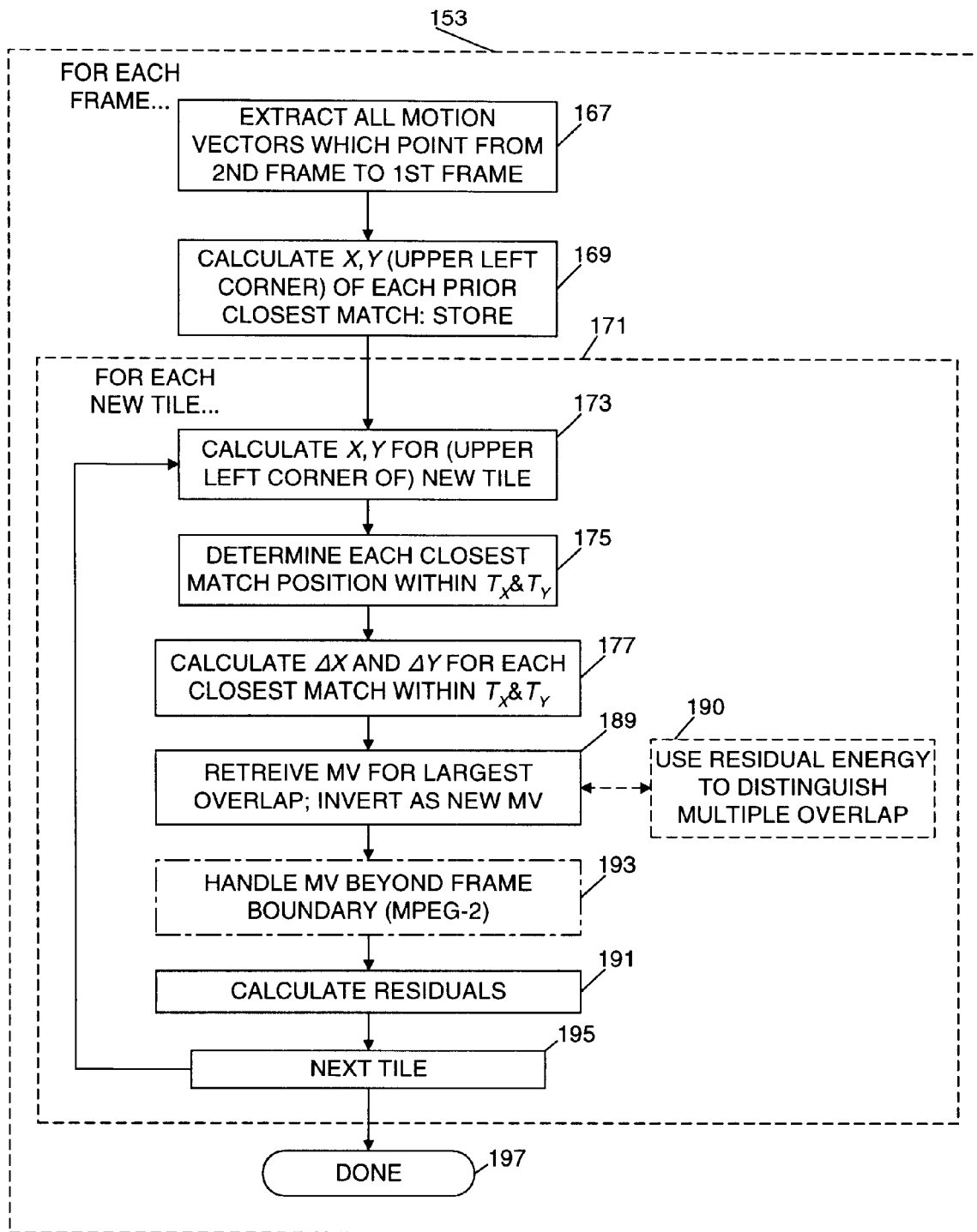
FIG. 8 is a software block diagram illustrating how a reverse motion vector field is used to obtain new motion vectors.

To accomplish this encoding, the software or firmware determines whether each frame has dependency information for re-compression, e.g., whether that frame has reverse direction data associating information in that frame with tiles of another frame, as indicated by decision block 151; if so, then that inverted information is used to quickly approximate a new motion vector field for the current frame, as indicated by the reference block 153 of FIG. 7 (this processing will be further described below, in connection with FIG. 8). If the frame is an I frame or a B frame, it is possible that all prior compression data may be re-used and the software makes a suitable determination in this regard; the reverse motion vector fields for a B frame may simply be the prior motion vectors exchanged, e.g., such that backward-pointing motion vectors become forward-pointing, and vice-versa. In these cases, it may also be possible to avoid fully decoding the picture data to the spatial domain. If no reverse direction data is available, the preferred software or firmware determines whether the current frame should be encoded as an I, P or B frame, in accordance with well known techniques for bit-rate matching and the like. If necessary, full motion search is conducted where no reverse direction information is available, as indicated by processing block 155.

Once suitable new motion vectors are available for the current frame, residuals are calculated using these motion vectors, and the residuals are fully encoded into bitstream format, as represented by reference blocks 157 and 159 in FIG. 7; this bitstream format is then output to a HDTV or other image source in compressed format, with the frame ordering represented by the bitstream being reversed with respect to the input bitstream. The software then proceeds to the next frame, as indicated by block 161, and so on, until the current GOP is finished, and the software or firmware then requests the previous GOP in image sequence.

The process 153 of calculating a reverse motion vector field is illustrated in FIG. 8. In particular, each frame is processed in the new order for output, and the system then proceeds to the next frame in the order.

As indicated via function block 167, for each frame which has dependency information as indicated by the flags mentioned above, a subroutine or module of the preferred software or firmware extracts all motion vectors which point to that frame from a later frame. If the frame was originally encoded as a B frame and both referenced frames are still present in the re-ordered sequence, then the prior motion vectors are preferably exactly re-used (with forward motion vectors and residuals acting used to point in the reverse direction, and vice-versa). If there is no reverse direction data available, e.g., the frame under consideration is a P or B frame for which the reverse play command has effectively cut a dependency, then the frame may require full motion search in at least one direction (e.g., a frame may have to be encoded using full motion search based on a new reference frame in at least one direction).

Where reverse direction data is available, each motion vector points from a tile in the later frame to a closest match in the frame currently being processed. Since each tile in the later frame has a known Cartesian coordinate position (i.e., X and Y coordinates), the corresponding motion vector is added to that tile to produce the closest match position in the current frame; these locations will in general be the upper left hand corner of the closest match positions. Once this closest match position calculation has been accomplished for all closest matches in the current frame, the preferred software or firmware proceeds to encode each tile of the current frame in accordance with the MPEG-2 standard.

To accomplish this encoding, the preferred software or firmware divides the current frame into tiles at known locations. As indicated by dashed-line block 171, each tile is separately processed by first taking a "local neighborhood" associated with the tile and determining whether it is overlapped by any closest match positions. In the preferred embodiment, the neighborhood is defined to exactly be the tile under consideration, although the neighborhood can be made larger or smaller as appropriate for the application at hand. Taking the preferred case where the local neighborhood and tile are identical, the upper left hand corner of the tile under consideration is determined and compared to the closest match table to determine whether any closest match positions are within one tile's distance in any direction. [If 16×16 pixel tiles are used, for example, then the preferred software or firmware determines whether any closest match locations are within +/−15 pixels of the current tile in each of the X and Y dimensions, and if 8×8 pixel tiles are used, within +/−7 pixels of the current tile in each dimension.] This processing is indicated by reference blocks 173 and 175 in FIG. 8. The software identifies each closest match position for which there is overlap and determines the amount of spatial overlap by taking the differences between X and Y coordinates, as represented by reference numeral 177 and the nomenclature ΔX and ΔY in FIG. 8.

Figure 9:
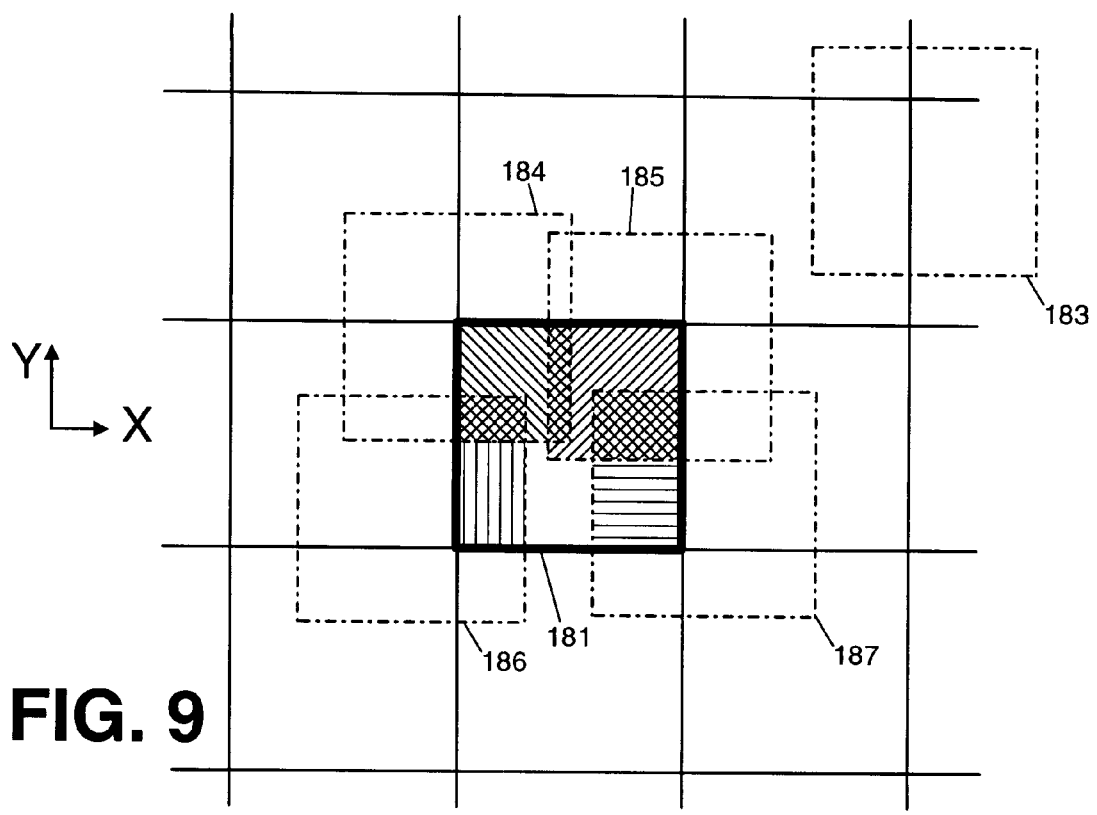
FIG. 9 is a close-up diagram of a hypothetical image frame showing nine MPEG-2 tiles of a current frame, one tile of which (in bold) is presently being processed for compression in the reverse direction. Superposed on FIG. 9 are five hypothetical prior closest matches which previously were used by a subsequent frame and for which there is pertinent comparative data between the two frames already available; portions of these closest matches which overlap a local neighborhood (identical in size to the tile of interest) are shaded for emphasis.
Figure 10:
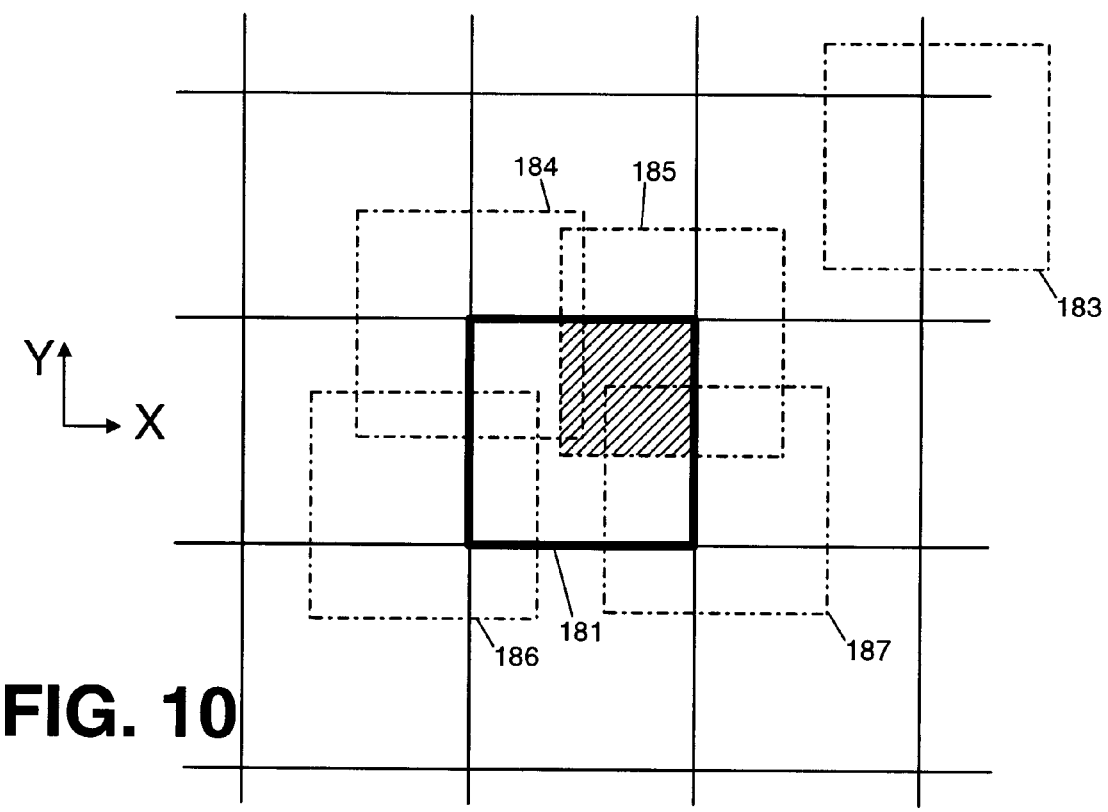
FIG. 10 shows the MPEG-2 tiles and the prior closest matches of FIG. 9, but having only one closest match with a shaded area, representing the fact that this hypothetical prior closest match has the largest overlap with the local neighborhood.

At this point an example, presented by FIGS. 9–10, would be helpful to understand the processing which occurs in the preferred embodiment. FIGS. 9–10 illustrate 9 tiles in solid lines, with a local neighborhood contiguous with a tile currently being processed designated by reference numeral 181 and bold lines. In dashed lines, five hypothetical closest match positions are shown and indicated by numerals 183–187. By comparison to closest match positions stored in memory, the preferred software determines that closest matches 184–187 overlap the current tile, as represented by shaded regions, while a closest match 183 is illustrated to have no overlap. The software or firmware consequently only processes the overlapping closest matches 184–187 by using the absolute value of their distances from the local neighborhood (e.g., 16-|Δ| and 16-|ΔY|, where "16" corresponds to the appropriate dimension of the local neighborhood). These distances are then multiplied, and the absolute value of the result is taken to yield a measure of relative proportion of spatial overlap.

For example, assuming use of 16×16 pixel tiles, the closest matches 184–187 may be assumed to have the following distances from the local neighborhood.

| CLOSEST MATCH | H. Overlap | V. Overlap | Total Overlap |
| --- | --- | --- | --- |
| 184 | 7 | 7 | 49 |
| 185 | 8 | 8 | 56 |
| 186 | 5 | 10 | 50 |
| 187 | 3 | 5 | 15 |

In this example, the closest match 185 has the greatest amount of overlap and, consequently, its corresponding motion vector is used to calculate a new motion vector for the current tile; the original motion vector is simply retrieved and inverted to now point from the current tile toward another frame. The location pointed to by the new motion vector is thereafter used for residual calculation. These processing steps are respectively designated in FIG. 8 using the reference numerals 189 and 191.

Notably, a potential problem arises in MPEG-2 if the new motion vector points outside of boundaries for the referenced image frame. In other standards such as H.263+, this pointing is permitted, as a conventional decoder includes boundary processing which can fill-in missing data. In the preferred embodiment, however, the new motion vector is tested to determine its compliance with frame boundaries, as indicated by block 193. If a motion vector strays outside of frame boundaries, then it is adjusted to point exactly to the closest complete 8×8 or 16×16 tile adjacent frame boundaries, and residual calculation performed using this adjusted motion vector. Once the current tile is processed, the preferred software or firmware proceeds to the next tile, until the present frame is completed, as indicated in FIG. 8 by processing blocks 195 and 197.

Situations may arise where two closest matches have the same amount of overlap. In this instance, the preferred software looks (as indicated by a processing block 190) at residual energy to select a motion vector corresponding to the smallest residual energy; residual energy indicates the differences between the closest match and the tile referred to and the lower the energy, the better the match.

Figure 11:
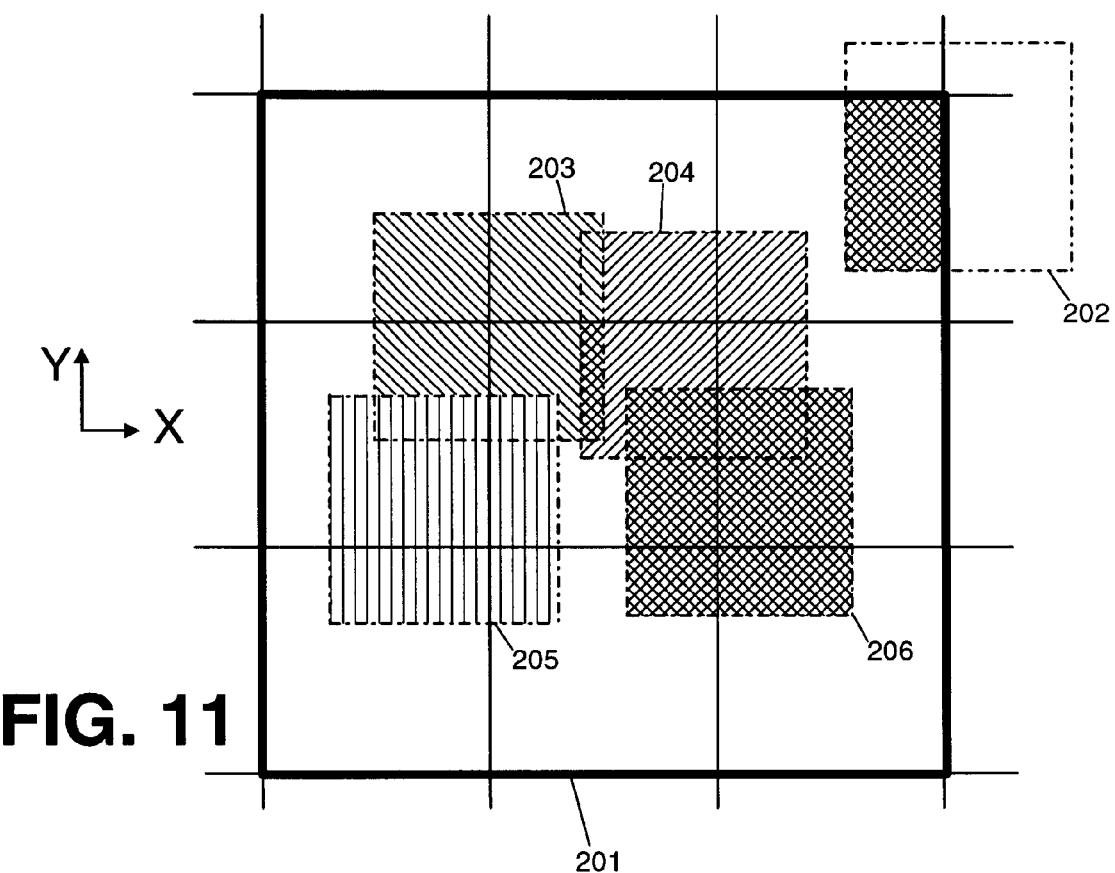
FIG. 11 shows processing in an alternative embodiment where the local neighborhood is defined to be at least as large as least nine tiles; in the embodiment represented, because four prior closest matches have maximum overlap (i.e., 100%) with the local neighborhood, preferred software looks to the residuals associated with these closest matches to determine which one is the best estimate for the tile of interest.

In fact, this processing is also indicated via FIG. 11 which shows an alternative embodiment. In this embodiment, an enlarged local neighborhood 201 is indicated in bold lines to be contiguous with nine image tiles. In this example, five closest matches 202–206 are seen to overlap the local neighborhood, as indicated by shaded regions. In this alternative embodiment, the software or firmware does not weight each closest match according to overlap, but rather, simply addresses the residual energy for each closest match for which there is any overlap; of these, the closest match having the lowest residual energy is selected, and its motion vector is retrieved from the special memory 121 (seen in FIG. 6), inverted, and used as a new motion vector.

Other embodiments of the present invention may use still further strategies for re-using prior motion vectors to calculate new motion vectors. For example, referring again to FIG. 9, prior motion vectors may be used in one of several manners to calculate a new motion vector. For example, software may analyze all prior motion vectors for which there is overlap and determine that a subset of these prior motion vectors (represented by blocks 184, 185 and 187) are consistent, and may discard inconsistent prior motion vectors, such as represented by block 186. Alternatively, motion vectors may be weighted according to proportion of spatial overlap in order to generate a new motion vector, e.g., $MV_{new}=k_1MV_1+k_2MV_{2+} \ldots +K_nMV_n$. Still further, software may determine that dispersion of prior motion vectors for which there is corresponding overlap represents image rotation, and may use all motion vectors or a subset thereof in interpolating a new motion vector (i.e., choosing motion based upon, but not identical to, the prior motion vectors). Also, while the preferred embodiment discussed above exactly re-uses inverted motion vectors, one may also choose to perform a limited motion search, e.g., within a small search area identified by the selected inverted motion vector, and with a new motion vector selected based on the smallest residual energy within the small search area.

As can be seen from the foregoing, the preferred embodiments potentially save substantial processing time by performing full motion search only where there is no overlapping closest match data. It will be recalled from an example provided earlier that the following reverse play frames

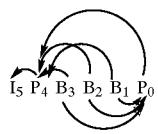

are to be played from the original sequence

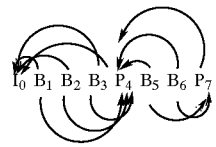

Applying the foregoing principles to this sequence, the preferred software or firmware (a) identifies a cut as occurring between frames 5 and 6; (b) converts frame 5 into an I frame; (c) sets flags for frames 4 and 0, indicating that image frames in the remaining sequence previously pointed to these frames; and (d) encodes frames 4 and 0 using this dependent information to calculate reverse motion vectors. For the middle frames, numbers 3, 2, and 1, these frames were previously B frames, and the preferred software determines that their original compression data may be re-used simply by using the original forward-pointing motion vectors and residuals as backward-pointing, and vice-versa.

The preferred embodiments discussed above should have ready application to video players which use the digital formats mentioned earlier. For example, implemented as software running on a PC, a user may view a compact disk (CD) containing a full-length movie, and may via software implement reverse play and other features in real-time, notwithstanding possibly wide variance in PC operating speed. Alternatively, implemented in a video disk player, VCR or other device, one may provide reverse play in real-time notwithstanding the use of compressed formats.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. For use with a system that receives an input image signal having at least a first frame and a second frame compressed in motion vector and residual format to depend upon data from the first frame, the system including a decompression engine that decompresses the frames and stores spatial domain images for the frames in memory, an improvement comprising a position calculation mechanism that extracts motion vectors represented by the input image signal, each motion vector pointing from the second frame to a closest match location in the first frame, and that calculates positions of associated closest matches; and a compression engine that compresses each of multiple data blocks of the first frame to motion vector and residual format to depend upon data from the second frame, the compression engine for each data block defining a local neighborhood, comparing the local neighborhood with at least one of the closest match positions to determine whether overlap exists, and if overlap exists, using at least one motion vector corresponding to overlap and calculating a new motion vector which points from the first frame to a closest match location in the second frame using at least one motion vector, and calculating residuals using the new motion vector.

2. An improvement according to claim 1, wherein the position calculating mechanism adds each motion vector to a tile location corresponding to that motion vector, to thereby calculate positions of each closest match location.

3. An improvement according to claim 1, further comprising obtaining the new motion vector by assigning a weight to each motion vector corresponding to overlap according to proportion of spatial overlap between the associated closest match and the associated local neighborhood, selecting the motion vector corresponding to the greatest amount of overlap and inverting that motion vector, and using the inverted motion vector as the new motion vector.

4. An improvement according to claim 1, further comprising obtaining the new motion vector by determining each motion vector corresponding to overlap, measuring residual energy for each for each motion vector corresponding to overlap, selecting the motion vector corresponding to the smallest amount of residual energy, inverting that motion vector, and using the inverted motion vector to calculate the new motion vector.

5. An improvement according to claim 1, further comprising obtaining the new motion vector by determining closest matches which spatially overlap the associated local neighborhood, and using a subset of the motion vectors corresponding to overlap to calculate the new motion vector.

6. An improvement according to claim 1, further comprising using a video player as the system and incorporating a reverse play function, such that the video player is effective to access a stored, compressed input image sequence and provide a compressed output image sequence representing reordered frames.

7. An improvement according to claim 1, further comprising for at least one data block for which no overlap exists, performing motion search to determine a closest match location in the second frame.

8. An improvement according to claim 1, further comprising for at least one data block for which no overlap exists, coding the block without prediction based on another image frame.

9. An improvement according to claim 1, wherein calculating a new motion vector includes searching for a new closest match within a limited region identified by an inverted motion vector, the new closest match identified by a set of data having the smallest residuals from among several possible sets of data.

10. A compression system adapted for use with a reverse play device, the reverse play device receiving a compressed image input including a later frame that is compressed in dependence upon an earlier frame, the reverse play device decoding the frames to the spatial domain to remove dependency between them, said compression system comprising:
   an extraction module that extracts motion vectors from the compressed image input and stores information representing closest match positions in the earlier frame identified by the extracted motion vectors; and
   at least one of firmware, software and hardware that compresses data from the earlier frame to depend upon the later frame, and that for each of multiple data blocks of the earlier frame
      accesses information stored by the extraction module to obtain at least one closest match position,
      compares a closest match position with a local neighborhood to determine whether there is overlap,
      in response to overlap, accesses an extracted motion vector corresponding to the overlap,
      uses an accessed, extracted motion vector to calculate a new motion vector which identifies the location of a closest match in the later frame, and
      calculates residuals using the new motion vector.

11. A system according to claim 10, wherein:
   the extraction module adds each motion vector to a tile location corresponding to that motion vector, to thereby calculate positions of closest match locations; and
   using an accessed, extracted motion vector includes inverting the motion vector and using the inverted motion vector as the new motion vector.

12. A system according to claim 10, further comprising at least one of software, firmware and hardware that obtains the new motion vector by assigning a weight to each motion vector corresponding to overlap according to proportion of spatial overlap between the associated closest match and the associated local neighborhood, selecting the motion vector corresponding to the largest overlap, inverting that motion vector and using the inverted motion vector as the new motion vector.

13. An improvement according to claim 10, further comprising at least one of software, firmware and hardware that obtains the new motion vector by determining each motion vector corresponding to overlap, measuring residual energy for each for each motion vector corresponding to overlap, selecting the motion vector corresponding to the smallest amount of residual energy, inverting that motion vector, and using the inverted motion vector as the new motion vector.

14. A system according to claim 10, further comprising at least one of software, firmware and hardware that obtains the new motion vector determining the proportion of spatial overlap between the associated closest match and the associated local neighborhood, and using a subset of the motion vectors corresponding to overlap to calculate the new motion vector.

15. A system according to claim 10, further comprising using a video player as the reverse play device and incorporating a reverse play function, such that the video player is effective to receive a stored, compressed input image sequence and provide a compressed output image sequence representing reordered frames.

16. A system according to claim 10, further comprising for at least one data block for which no overlap exists, performing motion search to determine a closest match location in the second frame.

17. A system according to claim 10, further comprising for at least one data block for which no overlap exists, coding the block without prediction based on another image frame.

18. A system according to claim 10, wherein calculating a new motion vector includes searching for a new closest match within a limited region identified by an inverted motion vector, the new closest match identified by a set of data having the smallest residuals from among several possible sets of data.

19. A reverse play system, comprising:
   a memory that stores original motion vectors and associated residuals for each of a plurality of frames of a compressed input image sequence;

a re-ordering mechanism that changes the order of at least some of the plurality of frames to effect reverse ordering; and a compression mechanism that compresses re-ordered frames as new motion vectors and associated residuals by for each one of plural data blocks of an image frame, determining whether data within the block was previously referred to by another image frame as a closest match, if data within the block was referred to as a closest match, inverting an original motion vector associated with that reference and using the inverted motion vector to calculate a new motion vector, and calculating residuals using the new motion vector.

20. A system according to claim 19, further comprising using original residuals to distinguish between two different references to data within the block as a current match and to select a new motion vector based thereon.

* * * * *